United States Patent [19]

Shaw et al.

[11] Patent Number: 4,578,431
[45] Date of Patent: Mar. 25, 1986

[54] PROCESS FOR IMPROVING MELT STRENGTH OF ETHYLENE POLYMERS BY TREATMENT WITH ORGANIC PEROXIDE

[75] Inventors: Richard G. Shaw, Bradley Beach; Peter J. Canterino, Towaco, both of N.J.

[73] Assignee: Mobil Oil Corporation, New York, N.Y.

[21] Appl. No.: 528,197

[22] Filed: Aug. 31, 1983

[51] Int. Cl.⁴ .............................................. C08F 8/08
[52] U.S. Cl. .................................. 525/387; 525/333.8
[58] Field of Search .............................. 525/333.8, 387

[56] References Cited

U.S. PATENT DOCUMENTS

| | | | |
|---|---|---|---|
| 2,528,523 | 11/1953 | Kent | 525/387 |
| 2,919,474 | 1/1960 | Cole | 525/387 |
| 3,079,370 | 2/1963 | Precopio et al. | 525/387 |
| 3,234,197 | 2/1966 | Baum | 525/387 |
| 3,444,155 | 5/1969 | Fish | 525/387 |
| 3,449,191 | 6/1969 | Taylor | 525/387 |
| 3,956,253 | 5/1976 | Braun | 525/387 |
| 4,006,283 | 2/1977 | MacKenzie, Jr. et al. | 526/57 |
| 4,015,058 | 3/1977 | Schober | 525/387 |
| 4,025,706 | 5/1977 | Schober | 526/57 |
| 4,061,694 | 12/1977 | Castagna | 525/387 |
| 4,112,208 | 9/1978 | McConnell et al. | 525/387 |
| 4,460,750 | 7/1984 | Thiersault et al. | 525/387 |

Primary Examiner—Joseph L. Schofer
Assistant Examiner—Bernard Lipman
Attorney, Agent, or Firm—Alexander J. McKillop; Michael G. Gilman; Edward J. Trojnar

[57] ABSTRACT

Melt strength of polyethylene and ethylene-higher olefin copolymers during processing is improved by pretreating the polymer in melt form at a temperature of at least 230° C. in the presence of an organic peroxide for a period of time equal to at least three times the half-life of the organic peroxide at the melt temperature.

9 Claims, No Drawings

PROCESS FOR IMPROVING MELT STRENGTH OF ETHYLENE POLYMERS BY TREATMENT WITH ORGANIC PEROXIDE

BACKGROUND OF THE INVENTION

Film made from ethylene-higher olefin copolymers, known as linear low density polyethylene, has toughness properties superior to film made from conventional low density polyethylene prepared under high pressure conditions. However, linear low density polyethylene has a low melt strength so that it is difficult to process at high speed and maintain a stable bubble in the blown tubular film process. The disadvantage of lower melt strength is also apparent in the blow molding of linear low density polyethylene and high density polyethylene. In accordance with this invention melt strength of polyethylenes can be improved without substantially affecting their desirable properties.

SUMMARY OF THE INVENTION

The melt strength of polyethylene and ethylene-higher olefin copolymers during processing is improved by pretreating the polyethylene polymer or copolymer in melt form, in the presence of an organic peroxide for a period of time equal to at least three times the half-life of the peroxide at the melt temperature.

DETAILED DESCRIPTION OF THE INVENTION

In accordance with this invention the melt strength of ethylene polymers during processing by formation into films or by blow molding is improved by pretreating the ethylene polymer in melt form in the presence of an organic peroxide for a period of time equal to at least three times the half-life of the peroxide at the polymer melt temperature. Preferably, the time is selected so that the organic peroxide is substantially decomposed during the pretreatment step. Therefore, it is preferred that the period of time of pretreatment be equal to at least five times of the half-life of the organic peroxide at the pretreating temperature.

The processing temperature can vary widely within a lower limit which is the practical melt temperature of the polymer and a higher temperature under which degradation of the polymer occurs. Thus, temperatures in the range of 120° C.-340° C. preferably from 230° C. to 280° C. can be used. Temperatures of about 260° C. have been found to be suitable with dicumyl peroxide.

The nature of the organic peroxide is not critical to this invention. The essential requirement is that the peroxide chosen have a half-life which permits its substantial decomposition at effective melt temperatures in a reasonable residence time. Thus, di (tertiary substituted) peroxides have been found suitable. Examples include dicumyl peroxide and di(t-butyl) peroxide. Generally, the amount of peroxide can vary from about 100 ppm to 2000 ppm based on the weight of the ethylene polymer. Preferably the amount of peroxide is 100 ppm to 1000 ppm.

The peroxide can be incorporated in any convenient manner. It has been found advantageous to spray the peroxide as a solution in a volatile solvent such as acetone onto the powdered polymer. Following removal of the solvent the polymer can be heated to a moderate temperature of about 60° C. and sealed containers for several hours to allow the peroxide to diffuse into the polymer. Then the polymer containing peroxide can be subjected to the melt treatment in any suitable apparatus such as an extruder.

The invention is illustrated by the following non-limiting example.

EXAMPLE 1

Linear LDPE, (ethylene-butene copolymer), available from Union Carbide as GRSN 7040 (2 MI, 0.920 density) was mixed with different amounts of dicumyl peroxide and extruded at 260° C. (500° F.). The resin was treated by spraying with an acetone solution of the peroxide evaporating the acetone, tubling in a drum blender and heating in an oven at 60° C. in a sealed polyethylene bag to allow the peroxide to diffuse into the resin. The melt strength of the resulting products were measured with a melt tensiometer and compared with a 2 MI, 0.920 density branched LDPE.

|  | PPM Peroxide | Melt Strength (grams) | RPM to Break Melt (rpm) |
|---|---|---|---|
| Linear Extruded Resin | 0 | 0.86 | 3000 |
| " | 100 | 1.95 | 2200 |
| " | 500 | 2.96 | 471 |
| " | 750 | 4.05 | 548 |
| Branched LDPE LMA-000 | 0 | 3.93 | 518 |
| LWA-000 | 0 | 3.18 | 637 |

It can be seen that the melt strength was increased to the same level as is obtained with the branched polyethylene.

EXAMPLE 2

In a manner similar to Example 1 a series of ethylene-butene copolymers were treated and extruded at 260° C. through a 1 inch Sterling unit. The melt index (MI) of the extruded samples is listed in the Table.

TABLE

|  |  | MI |
|---|---|---|
| Control | (stabilized resin) | 1.9 |
| RESIN | +0 ppm peroxide | 1.1 |
| " | +100 ppm peroxide | 0.67 |
| " | +500 ppm peroxide | 0.11 |
| " | +750 ppm peroxide | 0.08 |

On the blown film line the resin cured with 100 ppm peroxide processed into 1 mil film with improved bubbled stability as compared with the control. The 30 mm line was used to make 1 mil film at 2/1 BUR and 30 fpm. The head pressure increased from 1600 to 1900. The other two resins (500 and 750 ppm peroxide) could not be drawn down to 1 mil. The melt was too elastic and broke whenever a gel came through, instead of flowing around it as occurred in the control and 100 ppm peroxide modification.

Although the present invention has been described with preferred embodiments, it is to be understood that modifications and variations may be made without departing from the spirit and scope of the invention as those skilled in the art will readily understand.

What is claimed is:

1. A process treating a film-forming copolymer of ethylene and an olefin having 4 to 8 carbons atoms, or of a high density ethylene homopolymer, comprising:

heating said ethylene copolymer in melt form at a temperature of from about 230° C. to 340° C. in the presence of an effective amount of from 100 ppm to 2000 ppm of an organic peroxide for a period of time equal to at least three times the half-life of the organic peroxide at the heating temperature to increase the melt strength of said copolymer so that the copolymer is suitable for extrusion into a film by blown film extrusion.

2. The process of claim 1 in which said ethylene polymer is a copolymer of ethylene and an olefin having 4 to 8 carbon atoms and a density of 0.90 to 0.94.

3. The process of claim 1 in which said ethylene polymer is high density ethylene homopolymer.

4. The process of claim 1 in which said ethylene polymer is ethylene-hexane copolymer.

5. The process of claim 1 in which said ethylene polymer is treated for a period of time equal to at least five times the half-life of said organic peroxide at the pretreating temperature.

6. The process of claim 1 in which the pretreating temperature is between about 230° C. and 280° C.

7. The process of claim 1 in which said peroxide is a di(tertiary-substituted) peroxide.

8. The process of claim 1 in which said peroxide is dicumyl peroxide.

9. The process of claim 1 in which said peroxide is di(tertiary-butyl) peroxide.

* * * * *